United States Patent
Nishida et al.

(10) Patent No.: US 11,893,353 B2
(45) Date of Patent: Feb. 6, 2024

(54) VECTOR GENERATION DEVICE, SENTENCE PAIR LEARNING DEVICE, VECTOR GENERATION METHOD, SENTENCE PAIR LEARNING METHOD, AND PROGRAM

(71) Applicant: NIPPON TELEGRAPH AND TELEPHONE CORPORATION, Tokyo (JP)

(72) Inventors: Kosuke Nishida, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 710 days.

(21) Appl. No.: 16/977,045

(22) PCT Filed: Mar. 4, 2019

(86) PCT No.: PCT/JP2019/008473
§ 371 (c)(1),
(2) Date: Aug. 31, 2020

(87) PCT Pub. No.: WO2019/168202
PCT Pub. Date: Sep. 6, 2019

(65) Prior Publication Data
US 2021/0042472 A1    Feb. 11, 2021

(30) Foreign Application Priority Data
Mar. 2, 2018  (JP) .................................. 2018-038074

(51) Int. Cl.
*G06F 40/30*   (2020.01)
*G06F 40/253*  (2020.01)
(Continued)

(52) U.S. Cl.
CPC ............ *G06F 40/30* (2020.01); *G06F 40/242* (2020.01); *G06F 40/253* (2020.01); *G06N 3/045* (2023.01); *G06N 3/08* (2013.01)

(58) Field of Classification Search
CPC .... G06F 40/211; G06F 40/253; G06F 40/268; G06F 40/284; G06F 40/30; G06N 3/0895; G06N 3/08
See application file for complete search history.

(56) References Cited

U.S. PATENT DOCUMENTS 9,678,954 B1 *   6/2017  Cuthbert ............... G06F 40/242
2008/0195601 A1 * 8/2008  Ntoulas ................. G06F 16/319
                                              707/999.005
(Continued)

OTHER PUBLICATIONS

Sha et al., Recognizing textual entailment via multi-task knowledge assisted lstm, Chinese Computational Linguistics and Natural Language Processing Based on Naturally Annotated Big Data: 15th China National Conference, CCL 2016, and 4th International Symposium, pp. 285-298 (Year: 2016).*

(Continued)

*Primary Examiner* — Lamont M Spooner

(57) ABSTRACT

To make it possible to accurately generate a word vector even if vocabulary of a word vector data set is not limited. In a vector generating device 10 that generates vectors representing an input sentence P, when generating a series of the vectors representing the input sentence P based on vectors corresponding to words included in the input sentence P, a definition-sentence-considered-context encode unit 280 generates, based on a dictionary DB 230 storing sets of headwords y and definition sentences $D^y$, which are sentences defining the headwords y, concerning a word, which is the headword stored in the dictionary DB, among the words included in the input sentence P, the series of the (Continued)

vectors representing the input sentence P using the definition sentence $D^y$ of the headwords y.

20 Claims, 8 Drawing Sheets

(51) Int. Cl.
*G06F 40/242* (2020.01)
*G06N 3/08* (2023.01)
*G06N 3/045* (2023.01)

(56) References Cited

U.S. PATENT DOCUMENTS

| | | | | |
|---|---|---|---|---|
| 2012/0136863 | A1* | 5/2012 | Bobick | G06F 16/36 |
| | | | | 707/E17.014 |
| 2014/0279971 | A1* | 9/2014 | Bobick | G06F 16/951 |
| | | | | 707/693 |
| 2016/0350283 | A1* | 12/2016 | Carus | G06F 40/284 |
| 2017/0249549 | A1* | 8/2017 | Bai | G06V 10/809 |
| 2017/0351951 | A1* | 12/2017 | Santos | G06N 3/08 |
| 2018/0121799 | A1* | 5/2018 | Hashimoto | G06F 40/205 |
| 2018/0373691 | A1* | 12/2018 | Alba | G06F 40/166 |
| 2019/0122655 | A1* | 4/2019 | Min | G06N 3/08 |
| 2020/0320387 | A1* | 10/2020 | Ghaeini | G06F 40/20 |
| 2020/0342168 | A1* | 10/2020 | He | G06N 5/02 |

OTHER PUBLICATIONS

Bahdanau, Dzmitry, et al., "Learning to Compute Word Embeddings on the Fly," arXiv: 1706.00286v2 [cs.LG] Jun. 5, 2017, CoRR, bs.

* cited by examiner

|  | Total | matched | mismatched |
|---|---|---|---|
| ESIM | 67.4 | 66.9 | 68.0 |
| Bahdanau | 68.2 | 68.1 | 68.2 |
| THIS EMBODIMENT | 69.5 | 69.5 | 69.5 |

Fig. 9

| | Total | Matched | Mismatched | OOV | Telephone | Travel | Fiction | Government | Slate | Letters | Face to Face | 9/11 | OUP | Verbatim |
|---|---|---|---|---|---|---|---|---|---|---|---|---|---|---|
| NUMBER OF OOVS | 1999 | 1050 | 984 | 1999 | 34 | 367 | 161 | 225 | 287 | 159 | 47 | 158 | 205 | 430 |
| ESIM | 71.0 | 70.5 | 71.4 | 68.9 | 71.0 | 71.9 | 69.1 | 74.2 | 66.5 | 74.5 | 69.9 | 71.0 | 71.2 | 70.5 |
| Bahdanau | 71.5 | 71.3 | 71.6 | 69.1 | 73.0 | 70.9 | 70.4 | 75.1 | 67.3 | 74.7 | 71.5 | 70.5 | 71.0 | 70.1 |
| THIS EMBODIMENT | 72.0 | 71.3 | 72.7 | 69.7 | 73.3 | 72.0 | 69.7 | 75.5 | 66.2 | 75.2 | 72.4 | 70.4 | 73.2 | 72.0 | ns
VECTOR GENERATION DEVICE, SENTENCE PAIR LEARNING DEVICE, VECTOR GENERATION METHOD, SENTENCE PAIR LEARNING METHOD, AND PROGRAM

CROSS-REFERENCE TO RELATED APPLICATIONS

This application is a U.S. 371 Application of International Patent Application No. PCT/JP2019/008473, filed on 4 Mar. 2019, which application claims priority to and the benefit of JP Application No. 2018-038074, filed on 2 Mar. 2018, the disclosures of which are hereby incorporated herein by reference in their entireties.

TECHNICAL FIELD

The present invention relates to a vector generating device, a sentence pair learning device, a vector generating method, a sentence pair learning method, and a program and, more particularly, to a vector generating device, a sentence pair learning device, a vector generating method, a sentence pair learning method, and a program for usefully generating vectors of an input sentence that a neural network uses for natural language processing.

BACKGROUND ART

As one of basic techniques for semantic understanding for a sentence by a machine, there has been a relationship estimation technique for estimating a label representing relationship between a sentence and a sentence. For example, a problem of recognizing an implication relation between a sentence and a sentence has been extensively studied as "implication recognition".

In the problem of the implication recognition, a pair of a sentence called premise sentence (sentence P) and a sentence called assumption sentence (sentence H) is given and an implication relation between the sentence P and the sentence H is estimated. As the implication relation, three kinds of relations are defined: when the sentence P is true, the sentence H (1) is true, (2) is false, and (3) cannot be determined.

When such a problem of relationship estimation is solved by a neural network, first, a large amount of sets of sentence pairs and relation labels indicating relations among the sentence pairs are given in advance as learning data. A learning device learns parameters of a neural network such that the learning device can correctly estimate the relation labels of the sentence pairs.

In the relationship estimation, an input sentence pair is converted into a pair of word vector series using an existing word vector data set represented by word2vec and Glove. The pair of the word vector series is used as a feature value in the relationship estimation.

As such a relationship estimation technique by the neural network, in Non-Patent Literature 1, implication recognition is performed using a dictionary DB (database) other than the word vector data set and the learning data. The dictionary DB is constituted by a pair of a headword y and a sentence for explaining the headword y. The sentence for explaining the headword y is referred to as definition sentence $D^y$ of the headword. A set of all headwords y is referred to as vocabulary $V_D$.

In Non-Patent Literature 1, when the input sentence pair is converted into the pair of word vector series, about a word not included in the word vector data set among words constituting a sentence pair, the definition sentence $D^y$ of words having the words as the headwords y is extracted from the dictionary DB, words included in the definition sentence $D^y$ are converted into vectors using the neural network and combined into a word vector of the words.

This is for the purpose of coping with low frequency words, proper nouns, and technical terms not often included in an existing word vector data set among words included in an estimation target sentence pair.

In an experiment in Non-Patent Literature 1, accuracy improvement was confirmed under a situation in which vocabulary $V_E$ of the word vector data set was limited. Since the definition sentence $D^y$ of words is used, even when a word such as a technical term not included in learning data is added after learning, vector representation contributing to relationship estimation can be obtained.

In the existing method, a vector of a word not included in the word vector data set is often set at random or optionally.

In this regard, in Non-Patent Literature 1, since a network for converting a definition sentence of a dictionary is acquired during learning, the definition sentence can be converted into a vector using the learned neural network. Further, addition of a word and the definition sentence $D^y$ to the dictionary can be sequentially performed even after learning of a model.

CITATION LIST

Non-Patent Literature

Non-Patent Literature 1: D. Bandanau, T. Bosc, S. Jastrzebski, E. Grefenstette, P. Vincent, and Y. Bengio. Learning to compute word embeddings on the fly. CoRR, bs/1706.00286, 2017.

SUMMARY OF THE INVENTION

Technical Problem

However, in Non-Patent Literature 1, there is a problem in that, when a word included in the estimation target sentence pair is vectorized using the definition sentence $D^y$ of the dictionary DB, the word is converted into a unique vector without using information concerning the estimation target sentence pair.

The improvement of accuracy indicated by the experiment is only accuracy improvement under a special situation in which the vocabulary $V_E$ of the word vector data set is limited.

Since the definition sentence $D^y$ of the dictionary DB is represented by the word vector series, there is a characteristic that a lot of information is lost when the word vector series is converted into a word vector.

Accordingly, the definition sentence $D^y$, which is the word vector series, is desirably converted into a word vector while leaving a feature value contributing to sentence relationship recognition as much as possible.

The present invention has been devised in view of the above points, and an object of the present invention is to provide a vector generating device, a vector generating method, and a program that can generate appropriate vectors representing an input sentence.

Another object of the present invention is to provide a sentence pair learning device, a sentence pair learning method, and a program that can learn a neural network for accurately estimating relationship between a sentence pair.

Means for Solving the Problem

A vector generating device according to the present invention is a vector generating device that generates a series of vectors representing an input sentence, the vector generating device including a definition-sentence-considered-context encode unit that, when generating the series of the vectors representing the input sentence based on vectors corresponding to words included in the input sentence, generates, based on a dictionary DB storing sets of headwords and definition sentences, which are sentences defining the headwords, concerning a word, which is the headword stored in the dictionary DB, among the words included in the input sentence, the series of the vectors representing the input sentence using the definition sentence of the headword.

A vector generating method according to the present invention is a vector generating method of generating a series of vectors representing an input sentence, the vector generating method including, when generating the series of the vectors representing the input sentence based on vectors corresponding to words included in the input sentence, a definition-sentence-considered-context encode unit generating, based on a dictionary DB storing sets of headwords and definition sentences, which are sentences defining the headwords, concerning a word, which is the headword stored in the dictionary DB, among the words included in the input sentence, the series of the vectors representing the input sentence using the definition sentence of the headword.

With the vector generating device and the vector generating method according to the present invention, when generating a series of vectors representing an input sentence based on vectors corresponding to words included in the input sentence, the definition-sentence-considered-context encode unit generates, based on a dictionary DB storing sets of headwords and definition sentences, which are sentences defining the headwords, concerning a word, which is the headword stored in the dictionary DB, among the words included in the input sentence, the series of the vectors representing the input sentence using the definition sentence of the headword.

When generating a series of vectors representing an input sentence based on vectors corresponding to words included in the input sentence, by generating, based on a dictionary DB storing sets of headwords and definition sentences, which are sentences defining the headwords, concerning a word, which is the headword stored in the dictionary DB, among the words included in the input sentence, the series of the vectors representing the input sentence using the definition sentence of the headword in this way, it is possible to generate appropriate vectors representing the input sentence.

When generating the series of the vectors representing the input sentence using the definition sentence of the headword, the definition-sentence-considered-context encode unit of the vector generating device according to the present invention can generate, concerning the word, which is the headword stored in the dictionary DB, among the words included in the input sentence, a vector representing the headword considering relationship between the input sentence and the words included in the definition sentence having the word as the headword and use the vector as a vector of the word included in the input sentence.

The input sentence can be a pair of a first input sentence and a second input sentence, and the vector generating device according to the present invention can further include a relation-label estimation unit that estimates, based on a series of a first vector representing the first input sentence and a series of a second vector representing the second input sentence obtained by the definition-sentence-considered-context encode unit, a relation label indicating relationship between the first input sentence and the second input sentence.

A sentence pair learning device according to the present invention includes: an input unit that receives an input of a sentence pair to which a relation label indicating relationship is given in advance; a definition-sentence-considered-context encode unit that, when generating series of vectors representing sentences of the sentence pair based on vectors corresponding to words included in the sentence pair, respectively generates, using a neural network, based on a dictionary DB storing sets of headwords and definition sentences, which are sentences defining the headwords, concerning a word, which is the headword stored in the dictionary DB, among the words included in the sentence pair, the series of the vectors representing the sentences of the sentence pair using the definition sentence of the headword; a relation-label estimation unit that estimates, using the neural network, a relation label indicating relationship between the sentence pair based on each of the series of the vectors representing the sentences of the sentence pair obtained by the definition-sentence-considered-context encode unit; and a parameter learning unit that updates parameters of the neural network based on the relation label given to the sentence pair and the relation label estimated by the relation-label estimation unit.

A sentence pair learning method according to the present invention includes: an input unit receiving an input of a sentence pair to which a relation label indicating relationship is given in advance; a definition-sentence-considered-context encode unit respectively generating, using a neural network when generating series of vectors representing sentences of the sentence pair based on vectors corresponding to words included in the sentence pair, based on a dictionary DB storing sets of headwords and definition sentences, which are sentences defining the headwords, concerning a word, which is the headword stored in the dictionary DB, among the words included in the sentence pair, the series of the vectors representing the sentences of the sentence pair using the definition sentence of the headword; a relation-label estimation unit estimating, using the neural network, a relation label indicating relationship between the sentence pair based on each of the series of the vectors representing the sentences of the sentence pair obtained by the definition-sentence-considered-context encode unit; and a parameter learning unit updating parameters of the neural network based on the relation label given to the sentence pair and the relation label estimated by the relation-label estimation unit.

With the sentence pair learning device and the sentence pair learning method according to the present invention, the input unit receives an input of a sentence pair to which a relation label indicating relationship is given in advance and, when generating series of vectors representing sentences of the sentence pair based on vectors corresponding to words included in the sentence pair, the definition-sentence-considered-context encode unit respectively generates, using a neural network, based on a dictionary DB storing sets of headwords and definition sentences, which are sentences defining the headwords, concerning a word, which is the headword stored in the dictionary DB, among the words included in the sentence pair, the series of the vectors representing the sentences of the sentence pair using the definition sentence of the headword.

The relation-label estimation unit estimates, using the neural network, a relation label indicating relationship between the sentence pair based on each of the series of the vectors representing the sentences of the sentence pair obtained by the definition-sentence-considered-context encode unit and the parameter learning unit updates parameters of the neural network based on the relation label given to the sentence pair and the relation label estimated by the relation-label estimation unit.

When generating series of vectors representing sentences of the sentence pair based on vectors corresponding to words included in the sentence pair, by respectively generating, using a neural network, based on a dictionary DB storing sets of headwords and definition sentences, which are sentences defining the headwords, concerning a word, which is the headword stored in the dictionary DB, among the words included in the sentence pair, the series of the vectors representing the sentences of the sentence pair using the definition sentence of the headword, estimating, using the neural network, a relation label indicating relationship between the sentence pair based on each of the series of the vectors representing the sentences of the sentence pair obtained by the definition-sentence-considered-context encode unit, and updating parameters of the neural network based on the relation label given to the sentence pair and the relation label estimated by the relation-label estimation unit in this way, it is possible to learn a neural network for accurately estimating relationship between the sentence pair.

A program according to the present invention is a program for causing a computer to function as the units of the vector generating device or the sentence pair learning device explained above.

Effects of the Invention

With the vector generating device, the vector generating method, and the program of the present invention, it is possible to generate appropriate vectors representing an input sentence.

With sentence pair learning device, the sentence pair learning method, and the program of the present invention, it is possible to learn a neural network for accurately estimating relationship between a sentence pair.

BRIEF DESCRIPTION OF DRAWINGS

FIG. 9 is a diagram showing a result of an experiment 3 according to the second embodiment of the present invention.

DESCRIPTION OF EMBODIMENTS

Embodiments of the present invention are explained below with reference to the drawings.

Overview of a Vector Generating Device According to a First Embodiment of the Present Invention First, an overview of an embodiment of the present invention is explained.

In various tasks, an input to which is a sentence (a text), for example, a classification task and a sentence generation task by a neural network, first, the sentence to be input is converted into vector representation.

In this embodiment, when a definition sentence $D^y$ of words is vectorized, by using information concerning a processing target sentence, the definition sentence $D^y$ is converted while leaving a feature value further contributing to estimation.

Consequently, it is possible to further improve accuracy of the vector representation of the sentence and improve accuracy of a task thereafter.

Figure 1:
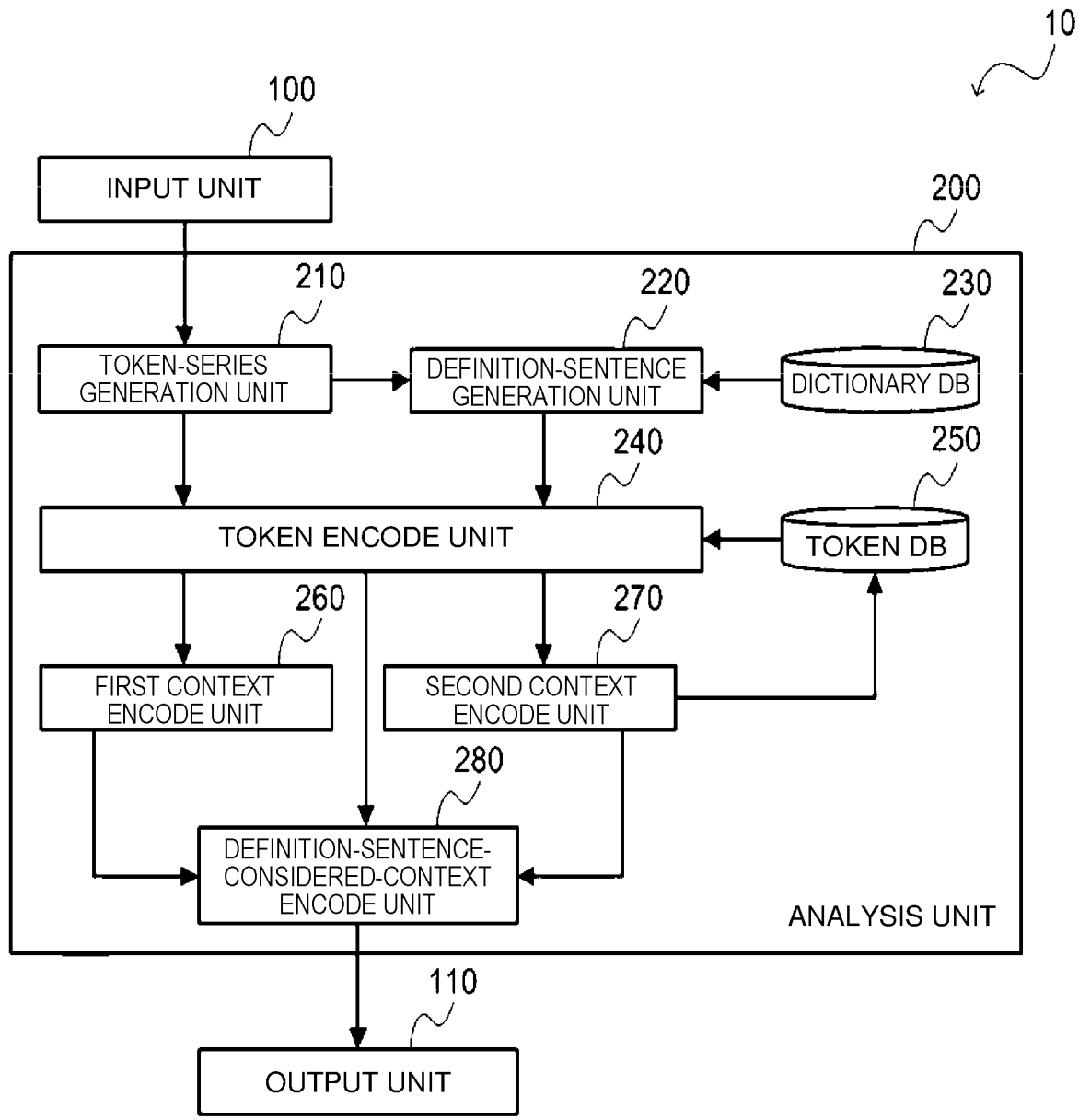
FIG. 1 is a functional block diagram showing the configuration of a vector generating device according to a first embodiment of the present invention.

Configuration of the Vector Generating Device According to the First Embodiment of the Present Invention The configuration of a vector generating device 10 according to the embodiment of the present invention is explained with reference to FIG. 1. FIG. 1 is a block diagram showing the configuration of the vector generating device 10 according to the embodiment of the present invention.

The vector generating device 10 is configured by a computer including a CPU, a GPU for executing calculation of a neural network, a RAM, and a ROM storing a program for executing a vector generation processing routine explained below. In terms of functions, the vector generating device 10 is configured as explained below.

As shown in FIG. 1, the vector generating device 10 according to this embodiment includes an input unit 100, an analysis unit 200, and an output unit 110.

The input unit 100 receives an input of an input sentence P.

The input unit 100 passes the received input sentence P to a token-series generation unit 210.

The analysis unit 200 generates, based on a dictionary DB 230 storing sets of headwords y and definition sentences $D^y$, which are sentences defining the headwords y, concerning a word, which is the headword, stored in the dictionary DB 230 among words included in the input sentence P, vectors representing the definition sentence $D^y$ of the headwords y and generates vectors representing the input sentence P using the generated vectors representing the definition sentence $D^y$.

Specifically, the analysis unit 200 includes the token-series generation unit 210, a definition-sentence generation unit 220, the dictionary DB (database) 230, a token encode unit 240, a token DB (database) 250, a first context encode unit 260, a second context encode unit 270, and a definition-sentence-considered-context encode unit 280.

The token-series generation unit 210 generates a series P of tokens from the input sentence P.

Specifically, the token-series generation unit 210 divides the input sentence P into tokens and generates the series P of the tokens. When the length of an input sentence is represented as $L_P$, the generated series P of the tokens is a vector having the size of $L_P$.

When words are used as the tokens, the length of the sentence is defined by the number of words. Any division units can be used as the tokens other than the words. In the following explanation, in this embodiment, the words are used as the tokens.

The token-series generation unit 210 passes a generated series P' of the words to the definition-sentence generation unit 220 and the token encode unit 240.

The definition-sentence generation unit 220 generates, concerning each of words, which are headwords stored in the dictionary DB 230, among the series P' of the words generated by the token-series generation unit 210, a series D of words from the definition sentence $D^y$ of the relevant headwords y.

Specifically, the definition-sentence generation unit 220 retrieves words included in the series P' of the words generated by the token-series generation unit 210 among the headwords y of the dictionary DB 230 and generates the series D of words obtained by dividing, concerning each of the relevant words, the definition sentence $D^y$ having the words as the headwords y to form a series. A set of words w, which are headwords included in the series P' of the words is represented as vocabulary $V_P$.

The number of vocabulary words (word w cardinality) of the vocabulary $V_P$ is represented as $N_e$ and the maximum length of the definition sentence $D^y$ is represented as $L_e$, the series D of words generated for each of the words included in the vocabulary $V_P$ is a vector having size $L_e$. When the length of the definition sentence $D^y$ is smaller than $L_e$, the length is increased to $L_e$ by, for example, adding a special word "PAD" to the end of the definition sentence $D^y$.

The definition-sentence generation unit 220 passes the ($N_e$) series D of the words generated for each of the words w included in the vocabulary $V_P$ to the token encode unit 240 and the second context encode unit 270.

The dictionary DB 230 stores sets of the words of the headwords y and the definition sentence $D^y$ of the headwords y. A set of the headwords y included in the dictionary DB 230 is represented as vocabulary $V_D$.

The token encode unit 240 generates, based on the series P of the words generated by the token-series generation unit 210, the series D of the words generated for each of the words w included in the vocabulary $V_P$ by the definition-sentence generation unit 220, and a plurality of word vectors stored in the token DB 250, a word vector series $P_1$ concerning each of the words included in the series P of the words and a word vector series $D_1$ concerning each of the words included in the series D of the words for each of the words w included in the vocabulary $V_P$.

Specifically, the token encode unit 240 extracts, concerning each of the words included in the series P of the words, a word vector corresponding to the word from the token DB 250 and generates the word vector series $P_1$.

Similarly, the token encode unit 240 extracts, for each of the words w included in the vocabulary $V_P$, concerning each of the words included in the series D of the words, a word vector corresponding to the word from the token DB 250 and generates the word vector series $D_1$.

When a dimension of the word vector stored in the token DB 250 is represented as d, the word vector series $P_1$ is ($N_e$) matrixes having size of $L_P \times d$ and the word vector series $D_1$ of each of the words w included in the vocabulary $V_P$ is ($N_e$) matrixes having size $L_e \times d$.

The token encode unit 240 passes the generated word vector series $P_1$ to the first context encode unit 260 and passes the generated word vector series $D_1$ to the second context encode unit 270. The word vector series $P_1$ and $D_1$ are sometimes used in the definition-sentence-considered-context encode unit 280.

In the token DB 250, a plurality of pairs of words and word vectors corresponding to the words are stored. The word vector is a set of vectors of words learned by the neural network in advance.

Specifically, for example, the token DB 250 only has to store, as the pairs of the words and the word vectors corresponding to the words, existing word vector data sets such as word2vec and GloVe. A word vector learned anew may be connected to the word vectors of the existing word vector data sets. For learning of a word vector, any word embedding technique such as a technique for encoding character information of words (reference document 1) can be used. The word vector can also be learned from a gradient that can be calculated by an error back propagation method.

[Reference document 1] Convolutional neural networks for sentence classification.

The token DB 250 stores a word vector series $D_2$ acquired by the second context encode unit 270.

The first context encode unit 260 converts, using the neural network, the word vector series $P_1$ generated by the token encode unit 240 into a word vector series $P_2$ considering a context.

Examples of the neural network include an RNN. An existing technique such as LSTM or SRU is used for the structure of the RNN. The SRU is a kind of an RNN proposed by reference document 2.

[Reference document 2] T. Lei and Y. Zhang. Training RNNs as fast as CNNs. CoRR, abs/1709.02755, 2017.

In this embodiment, the first context encode unit 260 converts the word vector series $P_1$ into the word vector series $P_2$ using a bidirectional RNN including an RNN that performs processing in a forward direction from a sentence head to a sentence end and an RNN that performs processing in a backward direction. When a dimension of a word vector output by the bidirectional RNN is represented as $d_1$, the word vector series $P_2$ is a matrix having size of $L_P \times d_1$.

The first context encode unit 260 passes the converted word vector series $P_2$ to the definition-sentence-considered-context encode unit 280.

The second context encode unit 270 converts, with the neural network, the word vector series $D_1$ of each of the words w included in the vocabulary $V_P$ generated by the token encode unit 240 into the word vector series $D_2$.

Specifically, the second context encode unit 270 converts, for each of the words w included in the vocabulary $V_P$, with the same method as the method of the first context encode unit 260, the word vector series $D_1$ into the word vector series $D_2$. The word vector series $D_2$ of each of the words w included in the vocabulary $V_P$ is ($N_e$) matrixes having size of $L_e \times d_1$.

Parameters of the neural network learned by the second context encode unit 270 are retained separately from the first context encode unit 260. However, the parameters may be shared with the context encode unit 260.

When a plurality of definition sentences $D^y$ are present, the definition sentences $D^y$ can be processed as one sentence by connecting the definition sentences $D^y$.

The token DB 250 can be updated using the word vector series $D_2$. As a new word vector for updating the word vector of the words w of the token DB 250, as in Non-Patent Literature 1, a word vector at the end of the word vector series $D_2$ corresponding to the words w (an output of a last state of the RNN) is used. Alternatively, there is a method of, for example, using an average of all word vectors(outputs in all states of the RNN) of the word vector series $D_2$.

The second context encode unit 270 passes the ($N_e$) word vector series $D_2$ converted for each of the words w included in the vocabulary $V_P$ to the token DB 250 and the definition-sentence-considered-context encode unit 280.

The definition-sentence-considered-context encode unit 280 generates, concerning the words w, which are the headwords stored in the dictionary DB 230, among the words included in the input sentence P, vectors representing a definition sentence $D^w$ of the words w considering relationship between the input sentence P and the words included in the definition sentence $D_2$ and generates a series of vectors representing the input sentence P using the generated vectors representing the definition sentence $D^w$.

The considered relationship between the input sentence P and the definition sentence $D^w$ indicates semantic similarity between the words constituting the input sentence P and the words constituting the definition sentence $D^w$.

When generating the word vector of the words w of the input sentence P using the vector series $D_2$ of the definition sentence corresponding to the words w, the definition-sentence-considered-context encode unit 280 performs processing such that a word vector series having high semantic similarity to the word vector of the words of the input sentence P in the word vector series $D_2$ is emphasized.

Specifically, the definition-sentence-considered-context encode unit 280 repeats step 1 to step 3 concerning each of the $N_e$ words w included in the vocabulary $V_P$.

(Step 1) A word vector series corresponding to a processing target word w among the $N_e$ word vector series $D_2$ is represented as $D_4$. The definition-sentence-considered-context encode unit 280 takes attention of the word vector series $P_2$ obtained by the first context encode unit 260 and the word vector series $D_4$ obtained by the second context encode unit 270. (Step 2) The definition-sentence-considered-context encode unit 280 converts the word vector series $D_2$ into a word vector $D_6$ using an attention result. (Step 3) The definition-sentence-considered-context encode unit 280 calculates, using the word vector $D_6$, a new word vector series $P_3$ obtained by converting the word vector series $P_2$.

(Step 4) The definition-sentence-considered-context encode unit 280 converts the finally obtained word vector series $P_3$ into a vector $P_4$ representing the input sentence P.

<<Step 1>> In the definition-sentence-considered-context encode unit 280, a word vector series corresponding to the processing target word w among the word vector series $D_2$ ($L_e \times d_1$) for each of the $N_e$ words w included in the vocabulary $V_P$ obtained by the second context encode unit 270 is represented as $D_4$. The word vector series $D_4$ is a matrix of $L_e \times d_1$.

The definition-sentence-considered-context encode unit 280 calculates an alignment matrix A according to the following Formula (1) using the word vector series $P_2$ obtained by the first context encode unit 260 and the word vector series $D_4$.

$$A = P_2 D_4^T \in \mathbb{R}^{L_P \times L_e} \quad \text{[Formula 1]}$$

When the word w is included in the input sentence P, a row equivalent to the word w in the alignment matrix A can be deleted or a 0 vector can be substituted in the row. The definition-sentence-considered-context encode unit 280 calculates an alignment vector $$a \in \mathbb{R}^{L_e}$$

from the alignment matrix A.

In conversion from the alignment matrix A into an alignment vector "a", the definition-sentence-considered-context encode unit 280 performs softmax conversion after converting the alignment matrix A into a vector on a $$\mathbb{R}^{L_e}$$

space using max pooling (the following Formula (2)) or average pooling (the following Formula (3)).

[Formula 2]

$$a_i = \max_{j \in [L_p]} A_{ji} \quad (2)$$

[Formula 3]

$$a_i = \frac{1}{L_p} \sum_{j \in [L_p]} A_{ji} \quad (3)$$

The definition-sentence-considered-context encode unit 280 calculates an attention vector $D_5$ according to the following Formula (4). That is, the definition-sentence-considered-context encode unit 280 weights words constituting the definition sentence $D_w$ based on a semantic matching result of the input sentence P calculated as the alignment matrix A and the definition sentence $D^w$ and generates the attention vector $D_5$.

[Formula 4]

$$D_5 = a^T D_4 \quad (4)$$

Here, $n_p$ ($n_p \geq 1$) attention vectors $D_5$ may be prepared. As flexibility of design for preparing a plurality of attention vectors $D_5$, the following methods can be combined.

A difference between max pooling and average pooling.

A direction of pooling is changed to calculate the alignment vector "a" as $$a \in \mathbb{R}^{L_P}$$

and calculate the attention vector $D_5$ as $$D_5 = a^T P_2$$

Without performing the pooling, the pooling can be performed on an attention vector $$A D_4 \in \mathbb{R}^{L_p \times d_1}$$

In Formula (4), a word vector series corresponding to the word w in a word vector series $D_1$ can be used instead of the word vector series $D_4$.

A word vector (a last state of the RNN) at the end of the word vector series $P_2$ can be used instead of the pooling. When the word w appears in the input sentence P, a word vector equivalent to the word w can be used.

As described in Non-Patent Literature 1, a difference from an original vector or an element product with the original vector can be used. As the original vector, a last state of the word vector series $D_4$ can be used. Besides, a word vector of the word w in the word vector series $P_2$ can be used.

By creating the attention vector using a plurality of methods and using the attention vector in this way, relationship (semantic similarity) in a plurality of viewpoints between the input sentence P and the words of the definition sentence $D_w$ can be considered.

<<Step 2>>

As a result of step 1, the word w can be represented by the $n_P$ attention vectors $D_5$. When a matrix in which the respective attention vectors $D_5$ are arranged is represented as $$X \in \mathbb{R}^{n_P \times d_1}$$

the definition-sentence-considered-context encode unit 280 convers, using the following Formula (5), the attention vectors $D_5$ into one vector $D_6$ as a vector representing a definition sentence.

[Formula 5]

$$D_6 = WX \quad (5)$$

Here, $$W \in \mathbb{R}^{n_p}$$

is a parameter of the neural network and can be learned during learning and, besides, can be designated beforehand.

In addition to linear conversion of Formula (5), multilayer perceptron (MLP) can be used.

The attention vectors $D_5$ may be vertically arranged like $$X \in \mathbb{R}^{n_p \cdot d_1}.$$

In this case, a parameter W is $$W \in \mathbb{R}^{d_1 \times n_p d_1}.$$

Similarly, the number of the attention vectors $D_5$ arranged vertically and horizontally can be freely designed.

<<Step 3>>

The definition-sentence-considered-context encode unit 280 substitutes the vector $D_6$ representing the definition sentence in the word vector corresponding to the word w in the word vector series $P_2$. Note that, other than the substitution, the vector $D_6$ may be added or coupled to the original word vector. Note that, when the vector $D_6$ is coupled to the original word vector, a dimension $d_1$ of the word vector needs to be adjusted.

When the repetition concerning the $N_e$ words included in the vocabulary $V_P$ in steps 1 to 3 ends, the word vector series $P_2$ after the substitution is represented as a word vector series $P_3$. The word vector series $P_3$ is a matrix having size of $L_P \times d_1$.

Note that operation can also be applied to a word vector of a word u not included in the vocabulary $V_D$ among the word vectors of the word vector series $P_2$. As specific operation, a word vector obtained by multiplying any $d_1$-dimensional vector by a predetermined coefficient is added to the word vector corresponding to the word u of the word vector series $P_2$, a word vector obtained by multiplying a word vector equivalent to the word u in the word vector series $P_1$ by the predetermined coefficient is added to the word vector corresponding to the word u of the word vector series $P_2$, or a combination of the word vectors is added to the word vector corresponding to the word u of the word vector series $P_2$. A coefficient and any vector to be added are designated beforehand or learned as parameters of the neural network.

<<Step 4>>

The definition-sentence-considered-context encode unit 280 can convert the word vector series $P_3$ into a word vector series $P_4$ using an existing method such as LSTM. The word vector $P_4$ is a matrix having size of $L_P \times d_1$.

The definition-sentence-considered-context encode unit 280 passes the generated word vector series $P_4$ to the output unit 110 as a series of vectors representing the input sentence P.

The output unit 110 outputs the series of the vectors representing the input sentence P obtained by the definition-sentence-considered-context encode unit 280.

Figure 2:
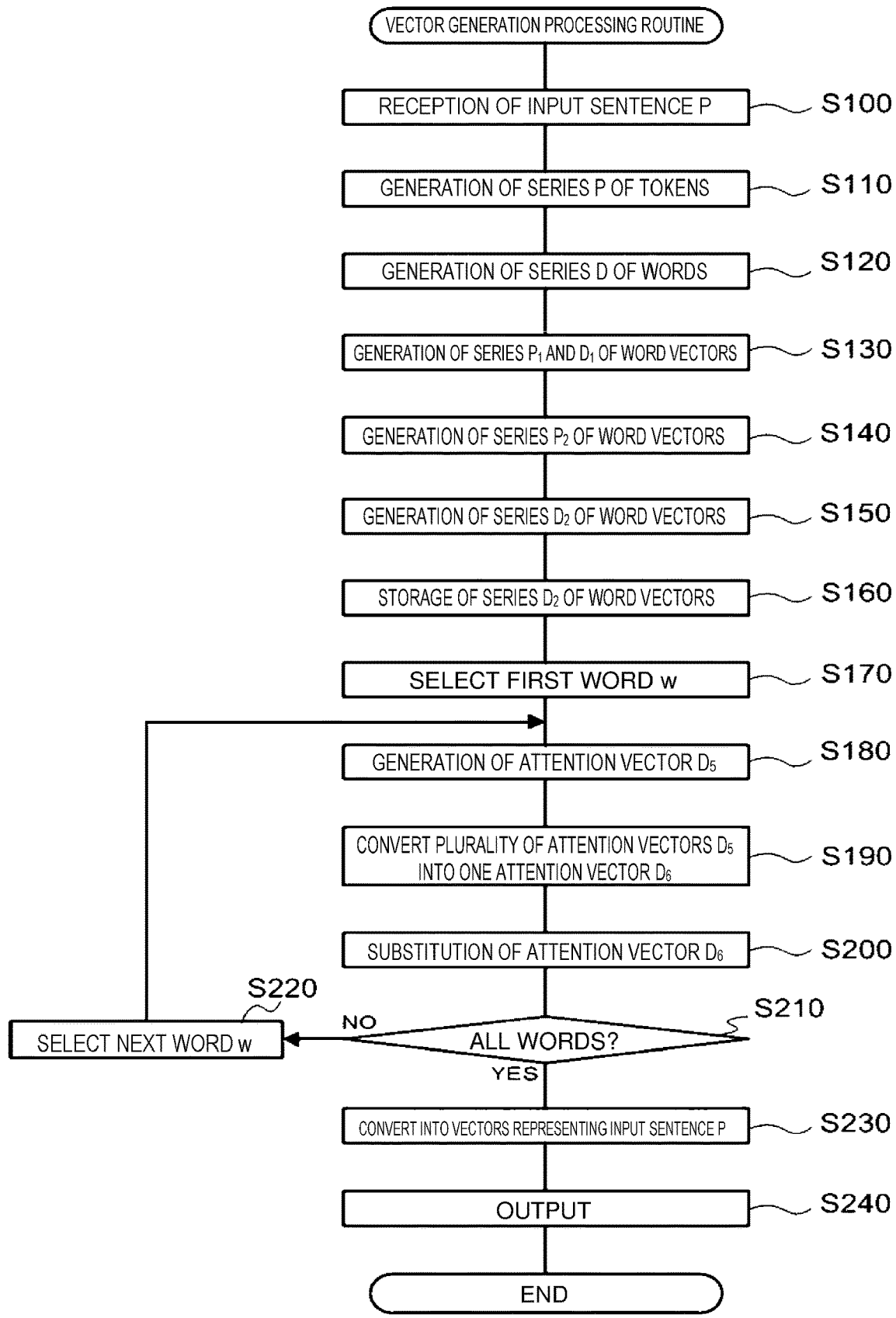
FIG. 2 is a flowchart showing a vector generation processing routine of the vector generating device according to the first embodiment of the present invention.

Action of the Vector Generating Device According to the First Embodiment of the Present Invention FIG. 2 is a flowchart showing a vector generation processing routine according to the embodiment of the present invention.

When the input sentence P is input to the input unit 100, the vector generation processing routine shown in FIG. 2 is executed in the analysis unit 200.

First, in step S100, the input unit 100 receives the input of the input sentence P.

In step S110, the token-series generation unit 210 generates the series P of tokens from the input sentence P.

In step S120, the definition-sentence generation unit 220 generates, concerning each of the words, which are the headwords stored in the dictionary DB 230, in the series P of the words generated by the token-series generation unit 210, the series D of words from the definition sentence $D^y$ of the headwords y.

In step S130, the token encode unit 240 generates, based on the series P of the words generated in step S110, the series D of the words generated for each of the words w included in the vocabulary $V_P$ in step S120, and the plurality of word vectors stored in the token DB 250, the word vector series $P_1$ concerning each of the words included in the series P of the words and the word vector series $D_1$ concerning each of the words included in the series D of the words for each of the words w included in the vocabulary $V_P$.

In step S140, the first context encode unit 260 converts the word vector $P_1$ generated in step S130 into the word vector series $P_2$ using the neural network.

In step S150, the second context encode unit 270 converts, with the neural network, the word vector series $D_1$ for each of the words w included in the vocabulary $V_P$ generated in step S130 into the word vector series $D_2$.

In step S160, the token DB 250 stores the word vector series $D_2$ acquired by the second context encode unit 270.

In step S170, the definition-sentence-considered-context encode unit 280 selects a first word w among the $N_e$ words included in the vocabulary $V_P$.

In step S180, the definition-sentence-considered-context encode unit 280 extracts the word vector series $D_4$ corresponding to the word w from the word vector $D_2$ obtained in step S150 and calculates the attention vector $D_5$ using the word vector series $P_2$ obtained in step S140 and the word vector series $D_4$.

In step S190, the definition-sentence-considered-context encode unit 280 converts the $n_P$ attention vectors $D_5$ into one vector $D_6$ using Formula (5).

In step S200, the definition-sentence-considered-context encode unit 280 substitutes the vector $D_6$ in the word vector corresponding to the word w in the word vector series $P_2$.

In step S210, the definition-sentence-considered-context encode unit 280 determines whether all of the $N_e$ words included in the vocabulary $V_P$ have been processed.

When not all of the words have been processed (NO in step S210), in step S220, the definition-sentence-considered-context encode unit 280 selects the next word w included in the vocabulary $V_P$ and returns to step S180.

On the other hand, when all of the words have been processed (YES in step S210), in step S230, the definition-sentence-considered-context encode unit 280 converts the word vector series $P_3$ into vectors representing the input sentence P using an existing method such as LSTM.

In step S240, the output unit 110 outputs the vectors representing the input sentence P obtained in step S230.

As explained above, with the vector generating device according to this embodiment, first, when a series of vectors representing an input sentence is generated based on vectors of words included in the input sentence, based on a dictionary DB storing sets of headwords and definition sentences, which are sentences defining the headwords, concerning a word, which is the headword stored in the dictionary DB, among the words included in the input sentence, vectors representing a definition sentence of the headword are generated. Appropriate vectors representing the input sentence can be generated by generating a series of vectors representing the input sentence using the vectors representing the definition sentence.

Note that, in this embodiment, the second context encode unit 270 and the first context encode unit 260 are formed in the same configuration but may be formed in different configurations. For example, one of the second context encode unit 270 and the first context encode unit 260 can be configured to perform linear conversion for word vectors. Parameters of the linear conversion can be either learned or designated beforehand.

Overview of a Sentence Pair Learning Device According to a Second Embodiment of the Present Invention In a second embodiment, when the definition sentence $D^y$ of the words is vectorized, information concerning a processing target sentence pair (a pair of the sentence P and the sentence H) is used to make it to possible to learn a network to perform conversion while leaving a feature value further contributing to estimation.

By using the definition sentence $D^y$ of the words, it is expected to obtain vector representation of words to "further contribute to recognition of sentence relationship".

Accordingly, the definition sentence $D^y$ of the words can be dynamically converted using information concerning an estimation target sentence pair and converted into different word vectors corresponding to sentence pairs.

That is, relationship between a sentence pair can be highly accurately implemented. In particular, accuracy of relationship estimation for sentences including low frequency words, proper nouns, and technical terms can be improved.

Estimation of test data including technical terms absent in learning data can be performed at higher accuracy than in the past. Technical terms after learning can be sequentially added.

Figure 3:
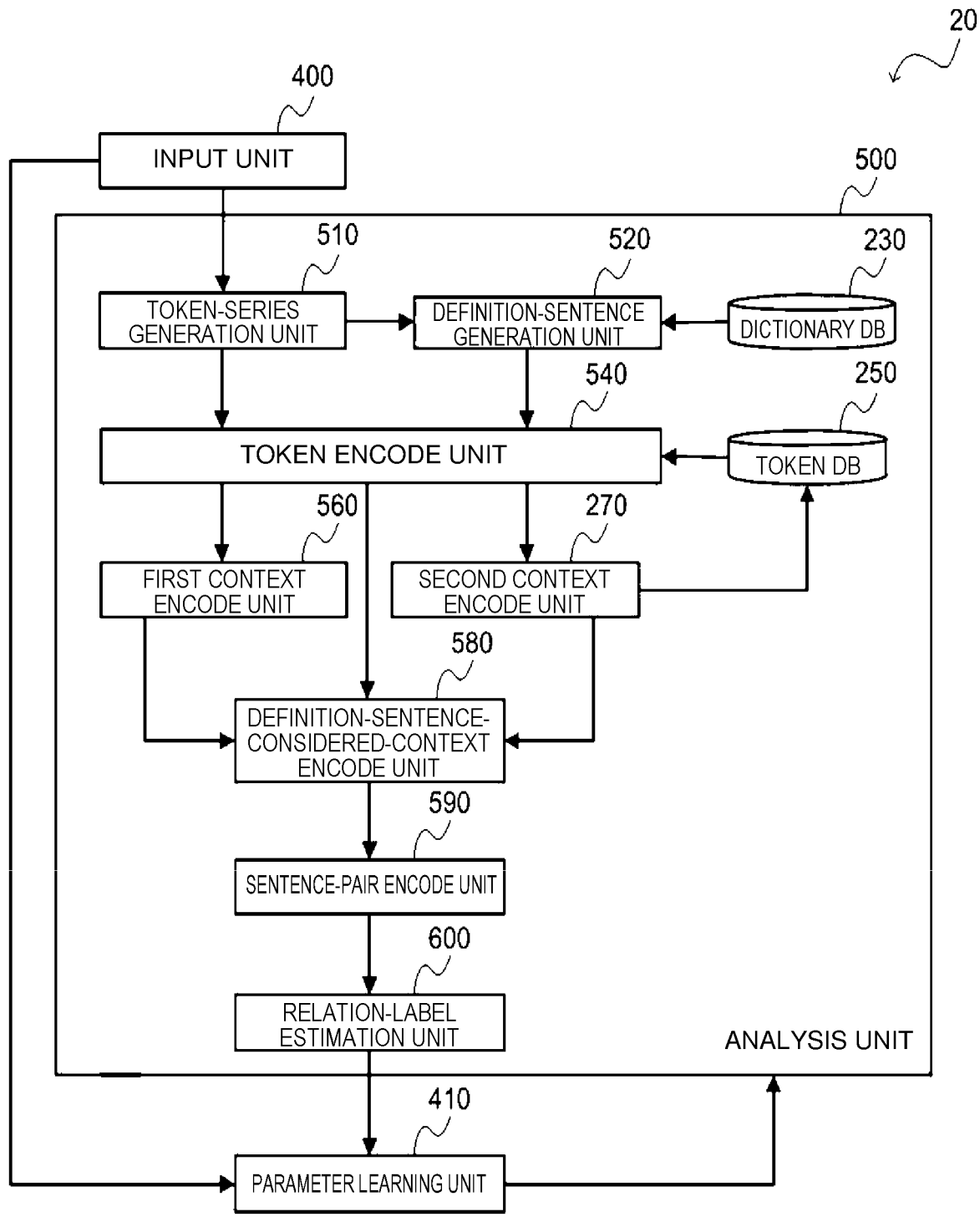
FIG. 3 is a functional block diagram showing the configuration of a sentence pair learning device according to a second embodiment of the present invention.

Configuration of the Sentence Pair Learning Device According to the Second Embodiment of the Present Invention The configuration of the sentence pair learning device according to the second embodiment of the present invention is explained with reference to FIG. 3. FIG. 3 is a block diagram showing the configuration of a sentence pair learning device 20 according to the embodiment of the present invention. Note that the same components as the components of the vector generating device 10 according to the first embodiment are denoted by the same reference numerals and signs and detailed explanation of the components is omitted.

As shown in FIG. 3, the sentence pair learning device 20 according to this embodiment includes an input unit 400, an analysis unit 500, and a parameter learning unit 410.

The input unit 400 receives an input of a sentence pair (the sentence P and the sentence H) to which a relation label indicating relationship is given in advance.

The input unit 400 passes the received sentence pair to the token-series generation unit 210 and the parameter learning unit 410.

The analysis unit 500 includes a token-series generation unit 510, a definition-sentence generation unit 520, the dictionary DB 230, a token encode unit 540, the token DB 250, a first context encode unit 560, the second context encode unit 270, a definition-sentence-considered-context encode unit 580, a sentence-pair encode unit 590, and a relation-label estimation unit 600.

The token-series generation unit 510 generates series P' and H' of tokens concerning each of the sentence P and the sentence H included in the sentence pair. In the following explanation, in this embodiment, as in the first embodiment, words are used as the tokens.

Specifically, like the token-series generation unit 210, the token-series generation unit 510 divides the sentence P and the sentence H respectively into words and generates the series P' and H' of the words. When the lengths of the input sentences P and H are respectively represented as $L_P$ and $L_H$, the generated series P' and H' of the words are respectively vectors having sizes of $L_P$ and $L_H$.

The token-series generation unit 510 passes the generated series P' and H' of the words to the definition-sentence generation unit 520 and the token encode unit 540.

The definition-sentence generation unit 520 generates, concerning each of words, which are the headwords y stored in the dictionary DB 230, in the series P' and H' of the words generated by the token-series generation unit 510, a series D of words from the definition sentence $D^y$ of the headwords.

Specifically, the definition-sentence generation unit 520 retrieves the words included in the series P' and H' of the words generated by the token-series generation unit 510 among the headwords y of the dictionary DB 230 and generates, concerning each of the relevant words, the series D of words obtained by dividing the definition sentence $D^y$ having the words as headwords into words to form a series. A set of the words w, which are headwords included in the series P' and H' of the words, is represented as vocabulary $V_{PH}$.

The number of vocabulary words (word w cardinality) of the vocabulary $V_{PH}$ is represented as $N_e$ and the maximum length of the definition sentence $D^y$ is represented as $L_e$. That is, $N_e$ is the number obtained by excluding words redundant in the series P and H of the words from the number of words included in the vocabulary $V_{PH}$ and included in the series P' and H' of the words. The series D of the words is a vector having size of $L_e$.

The definition-sentence generation unit 520 passes, for each of the words w included in the vocabulary $V_{PH}$, the ($N_e$) generated series D of the words to the token encode unit 540 and the second context encode unit 270.

The token encode unit 540 generates, based on the series P' and H' of the words generated by the token-series generation unit 510, the series D of the words generated for each of the words w included in the vocabulary $V_{PH}$ by the definition-sentence generation unit 220, and a plurality of word vectors stored in the token DB 250, the word vector series $P_1$ concerning each of the words included in the series P' of the words, a word vector $H_1$ concerning each of the words included in the series H' of the words for each of the words w included in the vocabulary $V_{PH}$ and the word vector series $D_1$ concerning each of the words included in the series D of the words for each of the words w included in the vocabulary $V_{PH}$.

Specifically, like the token encode unit 240, the token encode unit 540 generates the word vector series $P_1$ and the word vector series $D_1$. As in the generation of the word vector series $P_1$ in the token encode unit 240, the token encode unit 540 extracts, concerning each of the words included in the series H of the words, a word vector corresponding to the word from the token DB 250 and generates the word vector series $H_1$.

When a dimension of the word vectors stored in the token DB 250 is represented as d, the vector series $P_1$ is a matrix having size of $L_P \times d$, the word vector series $H_1$ is a matrix having size of $L_H \times d$, and the word vector series $D_1$ for each of the words w included in the vocabulary $V_{PH}$ is $(N_e)$ matrixes having size of $L_e \times d$.

The token encode unit 540 passes the generated word vector series $P_1$ and $H_1$ to the first context encode unit 560 and passes the word vector series $D_1$ to the second context encode unit 270. The word vector series $P_1$, $H_1$, and $D_1$ are sometimes used in the definition-sentence-considered-context encode unit 580.

The first context encode unit 560 converts, using a neural network, the word vector series $P_1$ and $H_1$ generated by the token encode unit 540 respectively into word vector series $P_2$ and $H_2$ considering a context.

Specifically, like the first context encode unit 260, the first context encode unit 560 converts the word vector series $P_1$ into the word vector series $P_2$ and converts the word vector series $H_1$ into the word vector series $H_2$.

The first context encode unit 560 passes the converted word vector series $P_2$ and $H_2$ to the definition-sentence-considered-context encode unit 580.

The definition-sentence-considered-context encode unit 580 generates, using the neural network, concerning the words w, which are the headwords stored in the dictionary DB 230 among the words included in the sentence pair (the sentence P and the sentence H), vectors representing the definition sentence $D^w$ of the words w and respectively generates, using the generated vectors representing the definition sentence $D^w$, series of vectors representing the sentences of the sentence pair.

Relationship between the sentence pair (the sentence P and the sentence H) and the definition sentence $D^w$ to be considered indicates semantic similarity among the words constituting the input sentence P, the words constituting the input sentence H, and the words constituting the definition sentence $D^w$.

When the word vector of the words w of the input sentences P and H is generated using the vector series $D_2$ of the definition sentence corresponding to the words w, processing is performed such that, among the word vector series $D_2$, a word vector series having high semantic similarity to the word vectors of the words of the input sentences P and H are emphasized.

Specifically, the definition-sentence-considered-context encode unit 580 repeats step 1 to step 4 concerning each of the $N_e$ words w included in the vocabulary $V_D$.

(Step 1) A word vector series corresponding to the processing target word w among the $N_e$ word vector series $D_2$ is represented as $D_4$. The definition-sentence-considered-context encode unit 580 takes attention of the word vector series $P_2$ obtained by the first context encode unit 560 and the word vector series $D_4$ obtained by the second context encode unit 270. (Step 2) The definition-sentence-considered-context encode unit 580 takes attention of the word vector series $H_2$ obtained by the first context encode unit 560 and the word vector series $D_4$. (Step 3) The definition-sentence-considered-context encode unit 580 converts the word vector series $D_2$ into the word vector $D_6$ using an attention result. (Step 4) The definition-sentence-considered-context encode unit 580 calculates, using the word vector $D_6$, a new word vector series $P_3$ obtained by converting the word vector series $P_2$ and calculates, using the word vector $D_6$, a new word vector series $H_3$ obtained by converting the word vector series $H_2$.

(Step 5) The definition-sentence-considered-context encode unit 580 converts the finally obtained word vector series $P_3$ into the series $P_4$ of vectors representing the sentence P and converts the finally obtained word vector series $H_3$ into a series $H_4$ of vectors representing the sentence H.

<<Step 1>> In the definition-sentence-considered-context encode unit 580, as in step 1 of the definition-sentence-considered-context encode unit 280, the word vector series $D_4$ is extracted from the word vector series $D_2$ for each of the words w included in the vocabulary $V_D$.

As in step 1 of the definition-sentence-considered-context encode unit 280, the definition-sentence-considered-context encode unit 580 calculates an attention vector $D_{5, P}$ according to Formula (4) using the word vector series $P_2$ obtained by the first context encode unit 560 and the word vector series $D_4$.

That is, $n_P$ attention vectors $D_{5, P}$ are obtained.

<<Step 2>>

As in step 1, the definition-sentence-considered-context encode unit 580 calculates an attention vectors $D_{5, H}$ using the word vector series $H_2$ obtained by the first context encode unit 560 and the word vector series $D_4$.

That is, $n_h$ attention vectors $D_{5H}$ are obtained.

<<Step 3>>

As a result of steps 1 and 2, the word w is represented by $n_P + n_h$ attention vectors $D_5$. When a matrix in which the respective attention vectors $D_5$ are arranged is represented as $$X \in \mathbb{R}^{(n_p+n_h) \times d_1},$$

the definition-sentence-considered-context encode unit 580 convers, using Formula (6), the attention vectors $D_5$ into one vector $D_6$ as vectors representing a definition sentence.

[Formula 6]

$$D_6 = WX \qquad (6)$$

Here, $$W \in \mathbb{R}^{n_p+n_h}$$

is a parameter of the neural network and can be learned during learning and, besides, can be designated beforehand.

In addition to the linear conversion of Formula (6), multilayer perceptron (MLP) can be used.

The attention vectors $D_5$ may be vertically arranged as $$X \in \mathbb{R}^{(n_p+n_h) \cdot d_1}.$$

In this case, a parameter W is $$W \in \mathbb{R}^{d_1 \times (n_p + n_h) d_1}.$$

Similarly, the number of the attention vectors $D_5$ arranged vertically and horizontally can be freely designed.

<<Step 4>>

The definition-sentence-considered-context encode unit 580 substitutes the vector $D_6$ representing the definition sentence of the words w in the word vector corresponding to the words w in the word vector series $P_2$ and $H_2$. Note that, other than the substitution, the vector $D_6$ may be added or coupled to the original word vector. Note that, when the vector $D_6$ is coupled to the original word vector, a dimension $d_1$ of the word vector needs to be adjusted.

When the repetition concerning the $N_e$ words included in the vocabulary $V_{PH}$ in steps 1 to 3 ends, the word vector series $P_2$ after the substitution is represented as the word vector series $P_3$ and the word vector series $H_2$ after the substitution is represented as the word vector series $H_3$. The word vector series $P_3$ is a matrix having size of $L_P \times d_1$. The word vector series $H_3$ is a matrix having size of $L_H \times d_1$.

Note that, as in step 3 of the definition-sentence-considered-context encode unit 280, operation can also be applied to the word vector of the word u not included in the vocabulary $V_D$ among the word vectors of the word vector series $P_2$ and $H_2$.

<<Step 5>>

The definition-sentence-considered-context encode unit 580 can convert the word vector series $P_3$ and $H_3$ into word vector series $P_4$ and $H_4$ using an existing method such as LSTM. The word vector $P_4$ is a tensor having size of $L_P \times d_1$ and the word vector series $H_4$ is a matrix having size of $L_H \times d_1$.

The definition-sentence-considered-context encode unit 580 passes the generated word vector series $P_4$ and $H_4$ to the sentence-pair encode unit 590 respectively as a series of vectors representing the sentence P and a series of vectors representing the sentence H.

The sentence-pair encode unit 590 generates, based on each of the word vector series $P_4$ and $H_4$, which are the series of the vectors representing the sentences of the sentence pair obtained by the definition-sentence-considered-context encode unit 580, the vector B used for relation label estimation.

Specifically, the sentence-pair encode unit 590 generates, using techniques of conventional technologies (for example, reference documents 3 to 5), a vector used for the relation label estimation.

[Reference document 3] Q. Chen, X. Zhu, Z. Ling, S. Wei, H. Jiang, and D. Inkpen. Enhanced LSTM for natural language in-ference. In ACL, 2017.

[Reference document 4] Bilateral Multi-Perspective Matching for Natural Language Sentences.

[Reference document 5] Natural Language Inference Over Interaction Space.

In the following explanation, the vector used for the relation label estimation is generated using the technique described in reference document 3.

First, the sentence-pair encode unit 590 calculates an alignment matrix $$A_P = P_4 H_4^T$$

using the word vector series $P_4$ and $H_4$ obtained by the definition-sentence-considered-context encode unit 580.

Subsequently, the sentence-pair encode unit 590 calculates, concerning rows of a matrix $A_P$, $A_P$ using a softmax function. The sentence-pair encode unit 590 calculates a word vector series $P_5$ obtained by vertically connecting $$P_4, A_P H_4, P_4 - A_P H_4, P_4 \odot A_P H_4.$$

The word vector series $P_5$ is $L_P \times 4d_1$.

$\odot$ is an element product.

The sentence-pair encode unit 590 calculates a word vector series $H_5$ concerning H as well. The word vector series $H_5$ is $L_H \times 4d_1$.

The sentence-pair encode unit 590 converts vectors of the word vector series $P_5$ and $H_5$ using a one-layer Feed Forward Network and calculates vector series $P_6$ and $H_6$. The vector series $P_6$ and $H_6$ are respectively $L_P \times d_2$ and $L_H \times d_2$.

Subsequently, the sentence-pair encode unit 590 converts the vector series $P_6$ and $H_6$ into vector series $P_7$ and $H_7$ with an RNN. The sentence-pair encode unit 590 calculates vectors $$P_M, P_A, H_M, H_A \in \mathbb{R}^{d_3}$$

obtained by performing max pooling and average pooling of the vector series $P_7$ and $H_7$ in a row direction.

The sentence-pair encode unit 590 passes the vector B in which $P_M$, $P_A$, $H_M$, and $H_A$ are vertically arranged to the relation-label estimation unit 600.

The relation-label estimation unit 600 estimates, using the neural network, based on the vector B obtained by the sentence-pair encode unit 590, a relation label indicating relationship of a sentence pair.

Specifically, the relation-label estimation unit 600 performs relation label estimation using the techniques of the conventional technologies (for example, reference documents 3 to 5).

When the technique described in reference document 3 is used, the relation-label estimation unit 600 convers, with the MLP, the vector B acquired from the sentence-pair encode unit 590 into a predetermined Z-dimensional vector and calculates, using a softmax function, a probability distribution concerning the relation label of the sentence pair. A value of Z is determined based on the number of relation labels to be estimated. For example, in an implication recognition task, Z is three dimensions corresponding to (1) true, (2) false, and (3) cannot be determined.

The relation-label estimation unit 600 may obtain a probability distribution as an estimation result or obtain a relation label having the highest probability as an estimation result.

The relation-label estimation unit 600 passes the estimation result to the parameter learning unit 410.

The parameter learning unit 410 updates, based on the relation label given to the sentence pair and the relation label estimated by the relation-label estimation unit, parameters of the neural network for estimating the relation label indicating the relationship between the sentence pair.

Specifically, the parameter learning unit 410 calculates a loss from the estimation result obtained by the relation-label estimation unit 600 and a correct answer label and updates, based on the calculated loss, the parameters of the neural network for estimating the relation label indicating the relationship between the sentence pair. When calculating the loss, the parameter learning unit 410 uses a loss function such as a cross entropy function.

The parameter learning unit 410 performs convergence determination based on estimation accuracy of the sentence pair, which is learning data. For example, the parameter learning unit 410 performs the convergence determination based on an increase or a decrease in the estimation accuracy and ends the learning when convergence occurs.

The parameter learning unit 410 passes the learned parameters to the analysis unit 500. The analysis unit 500 stores the learned parameters in a storage unit (not illustrated).

Figure 4:
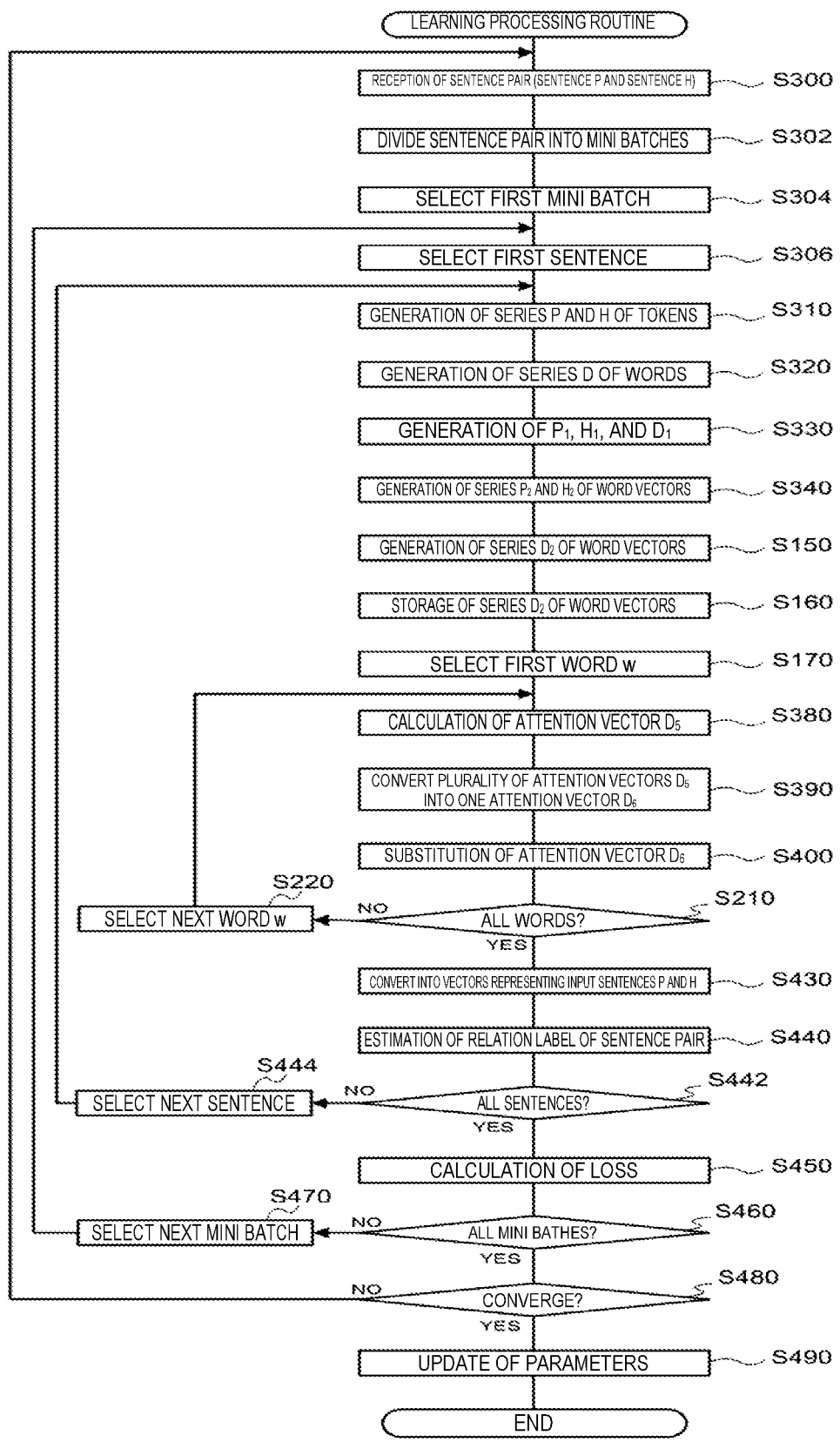
FIG. 4 is a functional block diagram showing the configuration of a relation label estimating device according to the second embodiment of the present invention.
Figure 5:
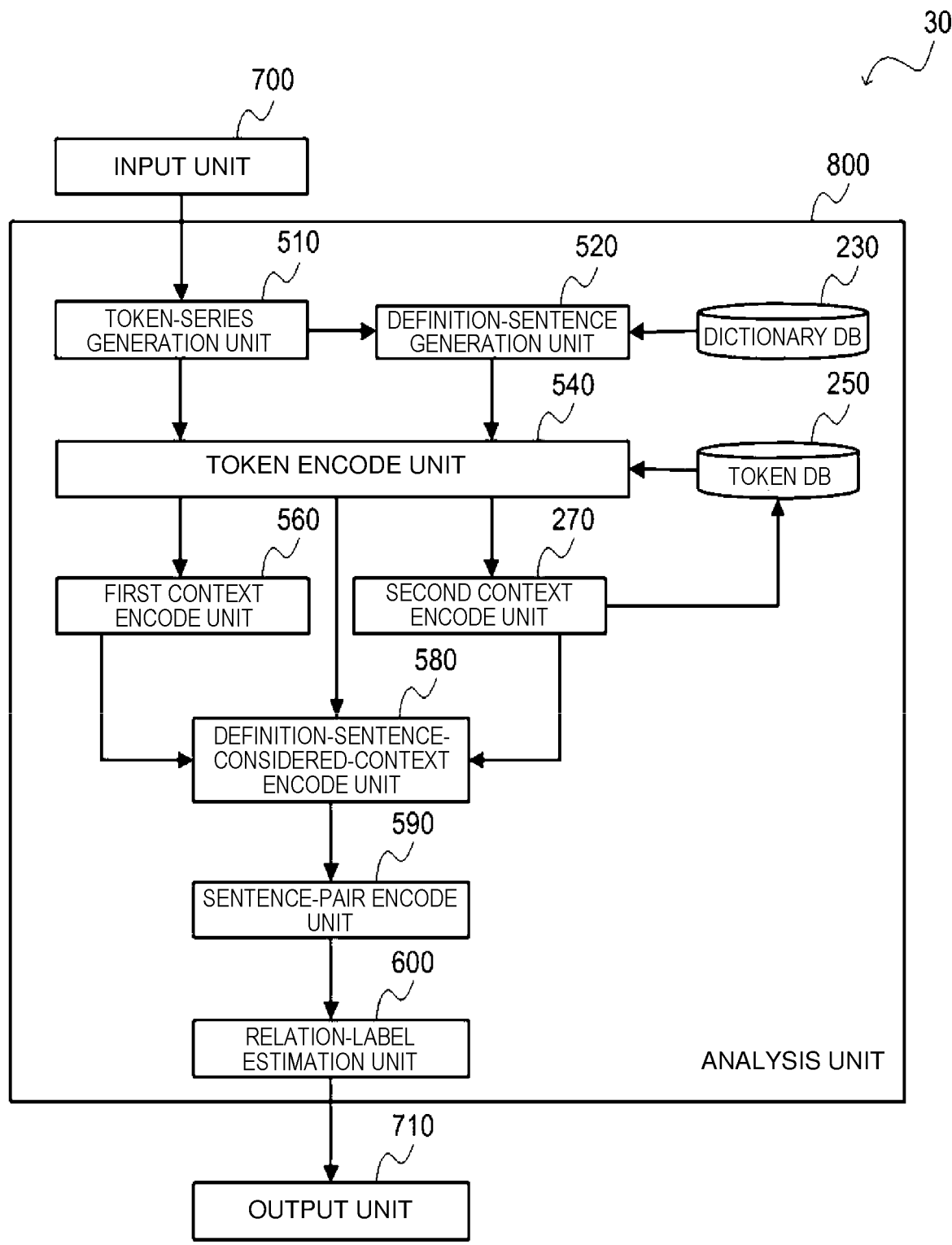
FIG. 5 is a flowchart showing a learning processing routine of a sentence pair learning device according to the second embodiment of the present invention.

Action of the Sentence Pair Learning Device According to the Second Embodiment of the Present Invention FIG. 4 is a flowchart showing a sentence pair learning routine according to the second embodiment of the present invention. Note that the same processing as the processing of the vector generation processing routine according to the first embodiment is denoted by the same signs and detailed explanation of the processing is omitted. In the following explanation, the sentence pair learning device according to this embodiment performs learning using mini batches. However, a learning method of any neural network can be used.

In step S300, the input unit 400 receives an input of a sentence pair (the sentence P and the sentence H) to which a relation label indicating relationship is given in advance.

In step S302, the token-series generation unit 510 divides the sentence pair received in step S300 into mini batches. The mini batch is a set of k sentence pairs obtained by dividing the sentence pair at random: k is a natural number equal to or larger than 1.

In step S304, the token-series generation unit 510 selects a first mini batch.

In step S306, the token-series generation unit 510 selects a first sentence.

In step S310, the token-series generation unit 510 generates the series P and H of tokens concerning each of the sentence P and the sentence H included in the first mini batch.

In step S320, the definition-sentence generation unit 520 generates, concerning each of words common in the headwords y of the dictionary DB 230 and the series P and H of the words generated in step S310, the series D of words from the definition sentence $D^y$ of the words.

In step S330, the token encode unit 540 generates, based on the series P and H of the words generated in step S310, the series D of the words generated in step S120, and the plurality of word vectors stored in the token DB 250, the word vector series $P_1$ concerning each of the words included in the series P of the words, the word vector $H_1$ concerning each of the words included in the series H of the words for each of the words w included in the vocabulary $V_{PH}$, and the word vector series $D_1$ concerning each of the words included in the series D of the words for each of the words w included in the vocabulary $V_{PH}$.

In step S340, the first context encode unit 560 converts the word vectors $P_1$ and $H_1$ generated in step S330 respectively into the word vector series $P_2$ and $H_2$ using the neural network.

In step S380, the definition-sentence-considered-context encode unit 580 extracts, using the neural network, the word vector series $D_4$ corresponding to the word w from the word vector $D_2$ obtained in step S150 and calculates the attention vector $D_5$ using the word vector series $P_2$ and $H_2$ obtained in step S340 and the word vector series $D_4$.

In step S390, the definition-sentence-considered-context encode unit 580 converts $n_P+n_H$ attention vectors $D_5$ into one vector $D_6$ using Formula (5).

In step S400, the definition-sentence-considered-context encode unit 580 substitutes the vector $D_6$ in word vectors corresponding to the word w in the word vector series $P_2$ and $H_2$.

In step S430, the definition-sentence-considered-context encode unit 580 convers the word vector series $P_3$ and $H_3$ into the word vector series $P_4$ and $H_4$ using an existing method such as LSTM.

In step S440, the relation-label estimation unit 600 estimates, using the neural network, based on each of the vectors representing the sentences of the sentence pair obtained in step S430, a relation label indicating the relationship between the sentence pair.

In step S442, the parameter learning unit 410 determines whether the processing has been performed for all of the sentences.

When the processing has been performed for not all of the sentences (NO in step S442), in step S444, the parameter learning unit 410 selects the next sentence and returns to step S310.

On the other hand, when the processing has been performed for all of the sentences (YES in step S442), in step S450, the parameter learning unit 410 calculates a loss from the estimation result obtained in step S440 and the correct answer label.

In step S460, the parameter learning unit 410 determines whether the processing has been performed for all of the mini batches.

When the processing has been performed for not all of the mini batches (NO in step S460), in step S470, the parameter learning unit 410 selects the next mini batch and returns to step S310.

On the other hand, when the processing has been performed for all of the mini batches (YES in step S460), in step S480, the parameter learning unit 410 performs convergence determination based on estimation accuracy.

When convergence occurs (NO in step S480), the parameter learning unit 410 returns to step S300, receives an input of new learning data, and repeats the processing in step S300 to step S480.

On the other hand, when the processing converges (YES in step S480), in step S490, the parameter learning unit 410 updates the learned parameters.

Configuration of a Relation Label Estimating Device According to the Second Embodiment of the Present Invention The configuration of a relation-label estimating device 30 that estimates an input relation label using the neural network learned by the sentence pair learning device 20 according to the second embodiment of the present invention is explained. Note that the same components as the components of the vector generating device 10 and the sentence pair learning device 20 according to the first embodiment are denoted by the same reference numerals and signs and detailed explanation of the components is omitted.

The relation-label estimating device 30 includes an input unit 700, an analysis unit 800, and an output unit 710.

The input unit 700 receives an input of a sentence pair (the sentence P and the sentence H).

The input unit 700 passes the received sentence pair to the token-series generation unit 810.

The analysis unit 800 includes the token-series generation unit 510, the definition-sentence generation unit 520, the dictionary DB 230, the token encode unit 540, the token DB 250, the first context encode unit 560, the second context encode unit 270, the definition-sentence-considered-context encode unit 580, the sentence-pair encode unit 590, and the relation-label estimation unit 600.

Specifically, the blocks of the analysis unit 800 performs processing based on parameters of the neural network learned by the sentence pair learning device 20.

The output unit 710 outputs an estimation result by the relation-label estimation unit 600.

Figure 6:
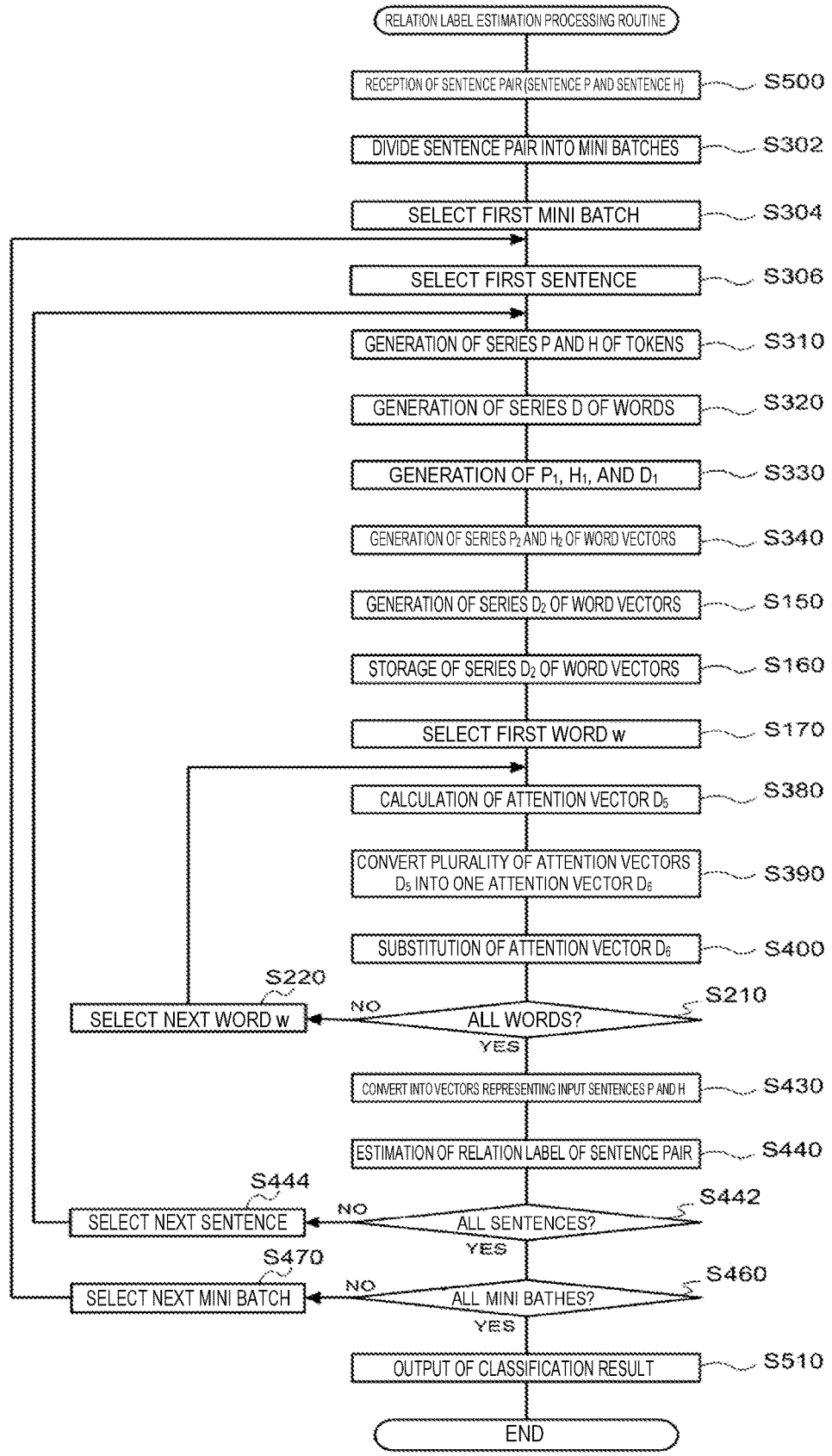
FIG. 6 is a flowchart showing a relation label estimation processing routine of the relation label estimating device according to the second embodiment of the present invention.

Action of the Relation Label Estimating Device According to the Second Embodiment of the Present Invention FIG. 6 is a flowchart showing a relation label estimation processing routine according to the second embodiment of the present invention. Note that the same processing as the processing of the vector generation processing routine and the sentence pair learning processing routine according to the first embodiment is denoted by the same signs and detailed explanation of the processing is omitted.

In step S500, the input unit 700 receives an input of a sentence pair (the sentence P and the sentence H).

In step S510, the output unit 710 outputs an estimation result by the relation-label estimation unit 600.

Experiment Result of a Method According to the Second Embodiment of the Present Invention An experiment in the method explained in the second embodiment is explained.

<<Comparative Method>>

The method was compared with two methods, a method described in reference document 3 (hereinafter, ESIM) and a method of Non-Patent Literature 1 (hereinafter, Bandanau) as a baseline model. In the Bandanau and this embodiment, modules were respectively added to the ESIM to perform experiments.

Note that the Bandanau has an object of supplementing a word vector of a set (OOV) of words not having word vectors stored in the token DB 250 among words appearing in a sentence pair. Therefore, a set of words that can be used is $(V_I \cap V_D) - V_E$.

Here, $V_I$ is a sum of sets of the words appearing in the sentence P and the sentence H concerning all sentence pairs. $V_E$ is a set of words of the token DB 250 learned beforehand.

In this embodiment, since an object is to improve relation label estimation accuracy by dictionary information, a set of words that can be used is $V_I \cap V_D$.

<<Experiment Setting>>

An MNLI data set is a data set described in reference document 6.

[Reference document 6] A. Williams, N. Nangia, and S. R. Bowman. A broad-coverage challenge corpus for sentence understanding through inference. CoRR, abs/1704.05426, 2017.

After a str.split( ) function of Python was performed to convert a sentence into words, preprocessing for uniting the words as lower case letters and deleting a part of signs such as punctuation marks was performed. A 300-dimensional GloVe840B vector learned beforehand was used in the token DB 250 (reference document 7).

[Reference document 7] G. A. Miller. WordNet: A lexical database for english.Commun. ACM, 38(11):39-41, 1995.

The words of the OOV were sampled at random from a regular distribution. The word vectors in the token DB 250 were fixed during learning.

For an RNN used for an encoder and a decoder, a two-layer bidirectional SRU was used (reference document 2). An output dimension number of the bidirectional SRU was set as $n_2=200$. A tanh function was used as an activation function.

Attention of the decoder was scaled by $$\frac{1}{\sqrt{n_2}}.$$

A dropout ratio was set to 0.45 and the same layer as the layer of the existing study (reference document 3) was used.

Learning was performed by one GPU. A mini batch size was set to 32. A method described in reference document 8 was used for optimization. A first momentum was set to 0.9 and a second momentum was set to 0.999. An initial learning ratio was set to 0.0004 and an attenuation ratio was set to 0.25. Learning was performed from learning data, a learning ratio was attenuated by scheduling, and evaluation was performed with development data.

[Reference document 8] D. P. Kingma and J. Ba. Adam: A method for stochastic optimization. CoRR, abs/1412.6980, 2014.

<<Dictionary>>

The vocabulary $V_D$ and the definition sentence $D_y$ of WordNet (reference document 7) were used as the dictionary DB 230. After the method described in reference document 7 was performed by the str.split( ) function of Python, preprocessing for uniting the words as lower case letters and deleting a part of signs such as punctuation marks was performed. In a polysemic word having a plurality of definition sentences $D^y$ for one headword y, a sentence obtained by connecting five definition sentences in descending order according to appearance frequencies of semantics provided in reference document 7 was represented as the definition sentence $D^y$.

A stop word described in reference document 9 was removed from the vocabulary $V_D$.

[Reference document 9] S. Bird, E. Klein, and E. Loper. Natural Language Processing with Python. O'Reilly Media, Inc., 2009.

<<Evaluation>>

Experiment 1

In an experiment 1, comparison of accuracy (a correct answer ratio) under a situation in which vocabulary of word vectors included in the token DB 250 was limited was performed according to an existing study of an implication recognition accuracy comparison (Non-Patent Literature 1) under a situation with a large number of OOVs.

By intentionally limiting the vocabulary of the word vectors included in the token DB 250, the influence on the accuracy of dictionary information under the situation with a large number of words of the OOV can be checked. Only 3000 words with high appearance frequencies in the learning data were used in the vocabulary $V_E$. The remaining words were OOVs. Vocabulary of a dictionary was all vocabulary words of WordNet.

Figures 7, 8:
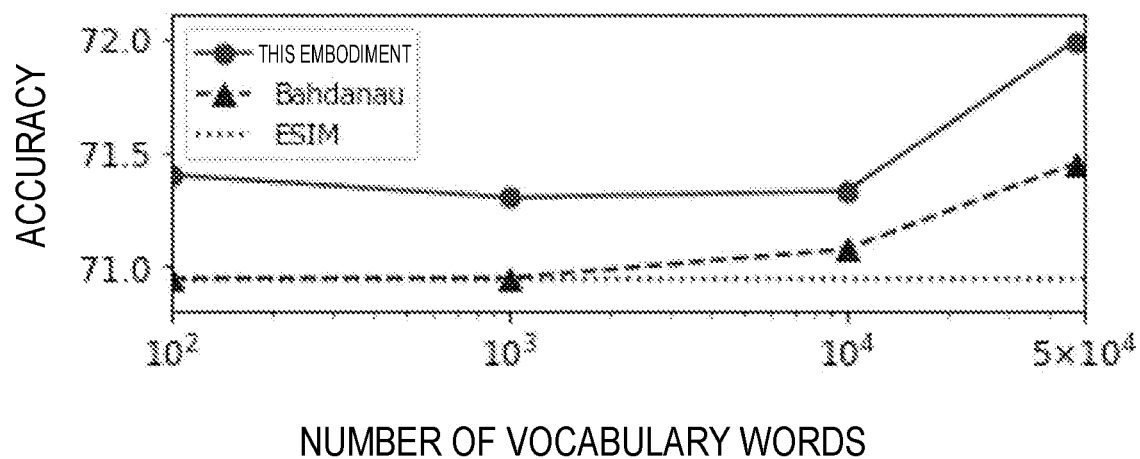
FIG. 7 is a diagram showing a result of an experiment 1 according to the second embodiment of the present invention.
FIG. 8 is a diagram showing a result of an experiment 2 according to the second embodiment of the present invention.

A result of the experiment 1 is shown in FIG. 7. Numerical values of FIG. 7 represents estimation accuracy of the relation label. MNLI consists of ten domains. Five domains are included in both of learning data and development data and are called matched domains. The remaining five domains are included in only the development data and is called mismatched domains.

In the experiment 1, the method in this embodiment showed highest estimation accuracy in both the domains. Accordingly, it was confirmed that the method in this embodiment improved the accuracy of the baseline model under the situation with the large number of words of the OOV. As in this experiment, when the $V_E$ was limited to 3000 words, the words other than the basic words were OOVs. Therefore, no large difference due to a difference between the matched and mismatched domains was not seen.

Experiment 2

In an experiment 2, in order to confirm whether the accuracy of the learning label estimation is improved when the number of vocabulary words of the dictionary DB 230 is increased, a change in estimation accuracy at the time when the number of vocabulary words of the dictionary DB 230 was changed in the MNLI data set was checked.

The vocabulary of the dictionary DB 230 was used in order from a word having the highest appearance frequency in the learning data and the development data. When the number of vocabulary words of the dictionary DB 230 is 0, the method of the Bandanau and the method in this embodiment coincide with the ESIM.

A result of the experiment 2 is shown in FIG. 8. FIG. 8 shows a change in the estimation accuracy of the relation label according to the number of vocabulary words of the dictionary DB 230. The right end of the number of vocabulary words in FIG. 8 is a result obtained when all the vocabulary words are used.

From FIG. 8, a tendency that accuracy is improved as the vocabulary words of the dictionary DB 230 are increased is seen. In the method of the Bandanau, improvement of accuracy does not occur when the number of vocabulary words is small. This is because, since the OOV is not included in the dictionary DB 230 having the small number of vocabulary words, the method of Bandanau et al. coincides with the ESIM.

In FIG. 8, in this embodiment, the highest accuracy is achieved in all the numbers of vocabulary words. In particular, a difference between the method of Bandanau et al. and the method in this embodiment at the time when the number of vocabulary words is small indicates usefulness of the token DB 250 concerning the definition sentence $D^y$ in frequently appearing words.

Experiment 3

In an experiment 3, an experiment was performed about whether a correlation is present between the number of OOVs and the estimation accuracy of the relation label. In the results of the experiment 1 and the experiment 2, it is unclear whether the usefulness of the token DB 250 concerning the definition sentence $D^y$ relies on the fact that a word is an OOV. Since the number of the OOVs is different for each of domains in the MNLI data set, a relation between the number of OOVs and the estimation accuracy of the relation label can be checked.

Therefore, in the experiment 3, the number of OOVs for each of domains and the estimation accuracy of the relation label were checked. A result of the experiment 3 is shown in FIG. 9. Numerical values of FIG. 9 represent the estimation accuracy of the relation label in the domains.

First, this embodiment achieved the highest estimation accuracy of the relation label in many domains including the entire MNLI data set. Next, in the estimation accuracy of the relation label in a sentence pair in which the OOV appears, the estimation accuracy is improved in the same degree as the other sentence pairs.

When focused on the number of OOVs for each of the domains, great improvement of accuracy is seen, for example, in domains of Telephone and Face to Face, although the number of OOVs is small. When a correlation coefficient between the number of OOVs and the estimation accuracy of the relation label was calculated using ten domains as samples, the correlation coefficient was −0.07, −0.38, and −0.21 and a p value was 0.86, 0.28, and 0.56 respectively in the method of ESIM, the method of Bandanau et al., and this embodiment.

<<<Examination>>>

A reason why a significant relation is not seen between the number of OOVs and performance is examined below. In setting of this experiment, since vocabulary prepared in GloVe widely covers vocabulary of the MNLI, non-OOVs appear more than OOVs. Therefore, the influence of the token DB 250 relating to the definition sentence $D^y$ is larger for the non-OOVs than the OOVs. Accordingly, this embodiment in which the token DB 250 is used for all the headwords y included in the dictionary is considered to have successfully improved the accuracy compared with the Bandanau.

That is, the estimation can be performed based on richer information by always using the definition sentence $D^y$ of the words. In this experiment, the word vectors of the token DB 250 were fixed for comparison. However, addition of a word vector to the token DB 250 is possible after the learning of the neural network. Therefore, the estimation accuracy of the relation label can be further improved.

Since a word vector corresponding to the information concerning the definition sentence $D^y$ is generated based on the definition sentence $D^y$ of the dictionary DB 230, a word vector can be created from the input and the definition sentence $D^y$ while leaving a useful feature value as much as possible in the estimation of a learning label. Since a specific part in the definition sentence $D^y$ can be focused through introduction of the definition-sentence-considered-context encode unit, there is superiority when the definition sentence $D^y$ is a long sentence or is a plurality of sentences representing polysemy. In particular, concerning a word having polysemy, there is an effect of semantic ambiguity resolution.

As explained above, with the sentence pair learning device according to this embodiment, first, when a series of vectors representing sentences of a sentence pair is generated, using a neural network, based on vectors of words included in the sentence pair, based on a dictionary DB storing sets of headwords and definition sentences, which are sentences defining the headwords, concerning a word, which is the headword stored in the dictionary DB, among the words included in the sentence pair, vectors representing a definition sentence of the headword are generated. The series of the vectors representing the sentences of the sentence pair are respectively generated using the generated vectors representing the definition sentence. A relation label indicating relationship between the sentence pair is estimated, using the neural network, based on each of the series of the vectors representing the sentences of the sentence pair. Parameters of the neural network are updated based on a relation label given to the sentence pair and the estimated relation label. Consequently, a neural network for accurately estimating the relationship between the sentence pair can be learned.

Note that the present invention is not limited to the embodiments explained above. Various modifications and applications are possible within a range not departing from the gist of the present invention.

In the example explained in this embodiment, the learning method uses the mini batch. However, the present invention is not limited to this. A learning method of any neural network may be used.

In the embodiments explained in this specification, the program is installed in advance. However, the program can also be provided while being stored in a computer-readable recording medium.

REFERENCE SIGNS LIST 10 vector generating device
20 sentence pair learning device
30 relation label estimating device
100 input unit
110 output unit
200 analysis unit
210 token-series generation unit
220 definition-sentence generation unit
230 dictionary DB
240 token encode unit
250 token DB
260 context encode unit
270 context encode unit
280 definition-sentence-considered-context encode unit
400 input unit
410 parameter learning unit
500 analysis unit
510 token-series generation unit
520 definition-sentence generation unit
540 token encode unit
560 context encode unit
580 definition-sentence-considered-context encode unit
590 sentence-pair encode unit
600 relation-label estimation unit
700 input unit
710 output unit
800 analysis unit
810 token-series generation unit

The invention claimed is:

1. A computer-implemented method for processing texts, the method comprising:
receiving an input text, wherein the input text comprises a headword;
receiving, based on the headword, a definition sentence from the dictionary database, wherein the dictionary database comprises one or more sets of headwords and definitions of the headwords, and wherein the definition sentence defines the headword; and
generating, based on the input text, a first series of vectors representing the input text;
generating, based on the definition sentence, a second series of vectors representing the definition sentence of the headword;
combining, based at least on a substitution of a vector for the headword in the input text with the second series of vectors, the first series of vectors and the second series of vectors according to an emphasis weight, wherein the emphasis weight is based on semantic similarly between a first set of words in the input text and a second set of words in the definition sentence;
generating, based on the combined first series of vectors and the second series of vectors, an output series of vectors, the output series of vectors representing the input text based on the definition sentence for words of the headword for improved accuracy of semantics of the input text;
training, using the generated output series of vectors for training, a neural network for estimating an implication relation between texts; and
providing, based on the trained neural network, the implication relation between a plurality of texts.

2. The computer-implemented method of claim 1, the method further comprising:
generating, based on at least one relationship between the input text and one or more words of the definition sentence, the output series of vectors representing the input sentence.

3. The computer-implemented method of claim 1, wherein the headword includes one or more of a proper noun and a technical term.

4. The computer-implemented method of claim 1,
wherein the input text comprises a pair of sentences,
wherein the pair of sentences comprises a first sentence and a second sentence,
wherein each of the first sentence and the second sentence including the headword, and
wherein the method further comprising:
receiving a predefined relationship label between the first sentence and the second sentence;
generating, based on the first sentence and the definition text, a first series of vectors representing the first sentence;
generating, based on the second sentence and the definition text, a second series of vectors representing the second sentence;
determining, based on the first series of vectors and the second series of vectors, a relationship label, wherein the relationship label represents a relationship between the first sentence and the second sentence in the pair of sentences; and
generating, based at least on a combination of the pair or sentences, the relationship label, and the predefined relationship for training, a neural network for estimating an implication relation between sentences.

5. The computer-implemented method of claim 4, the method further comprising:
generating, based on the first sentence and the definition text, the first series of vectors representing the first sentence using a first neural network;
generating, based on the second sentence and the definition text, the second series of vectors representing the second sentence using a second neural network; and
updating, based on the predefined relationship label and the determined relationship label, one or more parameters of, for learning, one or more of:
the first neural network, and
the second neural network.

6. The computer-implemented method of claim 4, wherein the first sentence is a premise sentence, wherein the second sentence represents an assumption sentence, and wherein the predetermined relationship represents a correct relationship between the premise sentence and the assumption sentence for generating the neural network based on learning.

7. The computer-implemented method of claim 4, wherein the determined relationship label is based on a probability distribution using the first series of vectors and the second series of vectors.

8. A system for processing texts, the system comprises:
a processor; and
a memory storing computer-executable instructions that when executed by the processor cause the system to:
receive an input text, wherein the input text comprises a headword;
receive, based on the headword, a definition sentence from the dictionary database, wherein the dictionary database comprises one or more sets of headwords and definitions of the headwords, and wherein the definition sentence defines the headword; and
generate, based on the input text, a first series of vectors representing the input text;
generate, based on the definition sentence, a second series of vectors representing the definition sentence of the headword;
combine, based at least on a substitution of a vector for the headword in the input text with the second series of vectors, the first series of vectors and the second series of vectors according to an emphasis weight, wherein the emphasis weight is based on a semantic similarly between a first set of words in the input text and a second set of words in the definition sentence;
generate, based on the combined first series of vectors and the second series of vectors, an output series of vectors, the output series vectors representing the input text based on the definition sentence for words of the headword for improved accuracy of semantics of the input text;
train, using the generated output series of vectors for training, a neural network for estimating an implication relation between texts; and
provide, based on the trained neural network, the implication relation between a plurality of texts.

9. The system of claim 8, the computer-executable instructions when executed further causing the system to:
generate, based on at least one relationship between the input text and one or more words of the definition sentence, the series of vectors representing the input sentence.

10. The system of claim 8, wherein the headword includes one or more of a proper noun and a technical term, and wherein the neural network trained without the headword.

11. The system of claim 8,
wherein the input text comprises a pair of sentences,
wherein the pair comprising a first sentence and a second sentence,
wherein each of the first sentence and the second sentence including the headword, and
the computer-executable instructions when executed further causing the system to:
receive a predefined relationship label between the first sentence and the second sentence;
generate, based on the first sentence and the definition text, a first series of vectors representing the first sentence;
generate, based on the second sentence and the definition text, a second series of vectors representing the second sentence;
determine, based on the first series of vectors and the second series of vectors, a relationship label, wherein the relationship label represents a relationship between the first sentence and the second sentence in the pair of sentences; and
generate, based at least on a combination of the pair or sentences, the relationship label, and the predefined relationship for training, a neural network for estimating an implication relation between sentences.

12. The system of claim 11, the computer-executable instructions when executed further causing the system to:
generate, based on the first sentence and the definition text, the first series of vectors representing the first sentence using a first neural network;
generate, based on the second sentence and the definition text, the second series of vectors representing the second sentence using a second neural network; and
update, based on the predefined relationship label and the determined relationship label, one or more parameters of, for learning, one or more of
the first neural network, and
the second neural network.

13. The system of claim 11, wherein the first sentence is a premise sentence, wherein the second sentence represents an assumption sentence, and wherein the predetermined relationship represents a correct relationship between the premise sentence and the assumption sentence for generating the neural network based on learning.

14. The system of claim 11, wherein the determined relationship label is based on a probability distribution using the first series of vectors and the second series of vectors.

15. A computer-readable non-transitory recording medium storing computer-executable instructions that when executed by a processor cause a computer system to:
receive an input text, wherein the input text comprises a headword;
receive, based on the headword, a definition sentence from the dictionary database,
wherein the dictionary database comprises one or more sets of headwords and definitions of the headwords, and wherein the definition sentence defines the headword; and
generate, based on the input text, a first series of vectors representing the input text;
generate, based on the definition sentence, a second series of vectors representing the definition sentence of the headword;
combine, based at least on a substitution of a vector for the headword in the input text with the second series of vectors, the first series of vectors and the second series of vectors;
generate, based on the combined first series of vectors and the second series of vectors, an output series of vectors, the output series of vectors representing the input text based on the definition sentence for words of the headword for improved accuracy of semantics of the input text according to an emphasis weight, wherein the emphasis weight is based on a semantic similarly between a first set of words in the input text and a second set of words in the definition sentence;
train, using the generated output series of vectors for training, a neural network for estimating an implication relation between texts; and
provide, based on the trained neural network, the implication relation between a plurality of texts.

16. The computer-readable non-transitory recording medium of claim 15, the computer-executable instructions when executed further causing the system to:

generate, based on at least one relationship between the input text and one or more words of the definition sentence, the series of vectors representing the input sentence.

17. The computer-readable non-transitory recording medium of claim 15, wherein the headword includes one or more of a proper noun and a technical term.

18. The computer-readable non-transitory recording medium of claim 15,
wherein the input text comprises a pair of sentences,
wherein the pair comprising a first sentence and a second sentence,
wherein each of the first sentence and the second sentence including the headword, and
the computer-executable instructions when executed further causing the system to:
receive a predefined relationship label between the first sentence and the second sentence;
generate, based on the first sentence and the definition text, a first series of vectors representing the first sentence;
generate, based on the second sentence and the definition text, a second series of vectors representing the second sentence;
determine, based on the first series of vectors and the second series of vectors, a relationship label, wherein the relationship label represents a relationship between the first sentence and the second sentence in the pair of sentences; and
generate, based at least on a combination of the pair or sentences, the relationship label, and the predefined relationship for training, a neural network for estimating an implication relation between sentences.

19. The computer-readable non-transitory recording medium of claim 18, the computer-executable instructions when executed further causing the system to:
generate, based on the first sentence and the definition text, the first series of vectors representing the first sentence using a first neural network;
generate, based on the second sentence and the definition text, the second series of vectors representing the second sentence using a second neural network; and
update, based on the predefined relationship label and the determined relationship label, one or more parameters of, for learning, one or more of:
the first neural network, and
the second neural network.

20. The computer-readable non-transitory recording medium of claim 18, wherein the first sentence is a premise sentence, wherein the second sentence represents an assumption sentence, and wherein the predetermined relationship represents a correct relationship between the premise sentence and the assumption sentence for generating the neural network based on learning.

* * * * *